US010118585B2

(12) United States Patent
Barron

(10) Patent No.: US 10,118,585 B2
(45) Date of Patent: Nov. 6, 2018

(54) VEHICLE SAFETY GUARD

(71) Applicant: Public Transportation Safety Int'l., Corp., Los Angeles, CA (US)

(72) Inventor: Mark B. Barron, Bel Air, CA (US)

(73) Assignee: Public Transportation Safety Int'l. Corp., Los Angeles, CA (US)

( * ) Notice: Subject to any disclaimer, the term of this patent is extended or adjusted under 35 U.S.C. 154(b) by 0 days.

(21) Appl. No.: 15/247,423

(22) Filed: Aug. 25, 2016

(65) Prior Publication Data
US 2018/0056926 A1 Mar. 1, 2018

(51) Int. Cl.
*B60R 21/34* (2011.01)
*B60Q 1/26* (2006.01)
*B60Q 1/32* (2006.01)
*B60R 21/0134* (2006.01)
*B62D 25/02* (2006.01)
(Continued)

(52) U.S. Cl.
CPC ............ B60R 21/34 (2013.01); B60Q 1/2661 (2013.01); B60Q 1/32 (2013.01); B60R 21/0134 (2013.01); B62D 25/02 (2013.01); *B60R 2021/003* (2013.01); *B60R 2021/0067* (2013.01); *B60R 2021/0104* (2013.01); *B60R 2021/01013* (2013.01); *B60R 2021/346* (2013.01)

(58) Field of Classification Search
CPC ... B60R 21/34; B60R 2021/003; B60R 19/54; B60R 19/56; B60R 19/565
See application file for complete search history.

(56) References Cited

U.S. PATENT DOCUMENTS 2,406 A 12/1841 Naglee et al.
3,450 A 2/1844 Tolles
(Continued)

FOREIGN PATENT DOCUMENTS

DE 2220674 11/1973
DE 243677 3/1987
(Continued)

OTHER PUBLICATIONS

Percy Hawksworth, Dispositif de sureté ou chasse-corps, pour véhicules automobiles, Mar. 14, 1914, EPO, Machine Translation of Description.*
(Continued)

*Primary Examiner* — James A English
(74) *Attorney, Agent, or Firm* — Diederiks & Whitelaw, PLC

(57) ABSTRACT

A safety guard which functions to push objects lying in the path of a vehicle out of the path of the wheels of the vehicle, such as a school bus, for safety purposes includes a front guard includes a first, fixed guard section and a second, movable guard section positioned at an angle of at least 30° in front of at least one wheel of the vehicle beneath the vehicle. More particularly, the first and second guard sections are hingedly interconnected such that the second guard section can pivot or otherwise shift from a first operational position to at least a second operational position relative to the first guard section upon engagement with an animate or inanimate object. At the same time, the second guard section is biased or otherwise forcibly shiftable by an actuator, such as a shock absorbing device, toward the first operational position.

21 Claims, 4 Drawing Sheets

(51) Int. Cl.
*B60R 21/00* (2006.01)
*B60R 21/01* (2006.01)

(56) References Cited

U.S. PATENT DOCUMENTS

| | | |
|---|---|---|
| 39,011 A | 6/1863 | Gillen |
| 45,316 A | 12/1864 | Castor |
| 55,663 A | 6/1866 | Jenkins |
| 79,600 A | 7/1868 | Riley |
| 159,632 A | 2/1875 | Blackford et al. |
| 190,563 A | 5/1877 | Day |
| 195,738 A | 10/1877 | Wood |
| 217,676 A | 7/1879 | Brown |
| 220,082 A | 9/1879 | Mahon |
| 223,473 A | 1/1880 | Brisac |
| 226,970 A | 4/1880 | Brisac |
| 238,258 A | 3/1881 | Stephenson |
| 339,857 A | 4/1886 | Clarke |
| 340,561 A | 4/1886 | Creager |
| 346,762 A | 8/1886 | Marston |
| 347,269 A | 10/1886 | Goldsmith |
| 354,831 A | 12/1886 | French |
| 364,230 A | 6/1887 | Durfee |
| 381,881 A | 4/1888 | Mahon |
| 394,975 A | 12/1888 | Hachenberg |
| 470,362 A | 3/1892 | Nagele |
| 488,353 A | 12/1892 | Gamage et al. |
| 489,320 A | 1/1893 | Mortimer et al. |
| 489,848 A | 1/1893 | Clarke |
| 490,772 A | 1/1893 | Mahon |
| 523,208 A | 7/1894 | Kallauner |
| 547,707 A | 10/1895 | Breul |
| 551,700 A | 12/1895 | Walier |
| 587,060 A | 7/1897 | Noraconk |
| 709,208 A | 9/1902 | Crandal |
| 711,569 A | 10/1902 | Hollis |
| 734,968 A | 7/1903 | Schwinger, Jr. |
| 806,143 A | 12/1905 | Hoey |
| 821,863 A | 5/1906 | Derr |
| 826,768 A | 7/1906 | Craley |
| 914,985 A | 3/1909 | Sprint |
| 962,323 A | 6/1910 | Deemer et al. |
| 993,448 A | 5/1911 | Hunt |
| 1,002,114 A | 8/1911 | Barnes |
| 1,011,214 A | 12/1911 | Lillich |
| 1,013,078 A | 12/1911 | Simon |
| 1,050,405 A | 1/1913 | Gelder |
| 1,060,475 A | 4/1913 | McGowan |
| 1,065,055 A | 6/1913 | Lawrence |
| 1,072,965 A | 9/1913 | Manteau |
| 1,091,499 A | 3/1914 | West |
| 1,095,017 A | 4/1914 | Minnich |
| 1,099,058 A | 6/1914 | Kruckow |
| 1,104,647 A | 7/1914 | Finkelstein |
| 1,132,147 A | 3/1915 | Arbeiter |
| 1,157,460 A | 10/1915 | Throckmorton |
| 1,218,583 A | 3/1917 | Rubenstein |
| 1,222,828 A | 4/1917 | Weinberg |
| 1,230,911 A | 6/1917 | Loeb |
| 1,232,835 A | 7/1917 | Ostrowiecki |
| 1,295,692 A | 2/1918 | Cantlon |
| 1,283,428 A | 10/1918 | Tookey |
| 1,325,690 A | 12/1919 | Cantlon |
| 1,325,705 A | 12/1919 | Sleeman |
| 1,372,081 A | 3/1921 | Myers |
| 1,397,825 A | 11/1921 | Thompson |
| 1,411,254 A | 4/1922 | Braucci |
| 1,412,524 A | 4/1922 | Howard |
| 1,416,610 A | 5/1922 | Cochran |
| 1,464,205 A | 8/1923 | Kuno |
| 1,485,332 A | 2/1924 | Edwards |
| 1,553,656 A | 9/1924 | Williams |
| 1,511,085 A | 10/1924 | McIntyre |
| 1,523,623 A | 1/1925 | Altman |
| 1,530,017 A | 3/1925 | Souliotis |
| 1,581,041 A | 4/1926 | De Barrios |
| 1,586,786 A | 6/1926 | Davies |
| 1,691,018 A | 11/1928 | Scott |
| 1,700,645 A | 1/1929 | Ritenour |
| 1,730,733 A | 10/1929 | Judd |
| 1,737,952 A | 12/1929 | Storch et al. |
| 1,742,148 A | 12/1929 | Ritenour |
| 1,748,304 A | 2/1930 | Miyaoka |
| 1,805,933 A | 5/1931 | Victor |
| 1,848,310 A | 3/1932 | Brown |
| 1,885,611 A | 11/1932 | Lilley |
| 1,899,937 A | 3/1933 | Brown |
| 1,936,054 A | 11/1933 | Harzbecker |
| 2,017,227 A | 10/1935 | Barnhart |
| 2,038,234 A | 4/1936 | Olen |
| 2,078,679 A | 4/1937 | Golphin |
| 2,336,536 A | 12/1943 | Ferguson |
| 2,605,119 A | 7/1952 | Earnest |
| 2,647,763 A | 8/1953 | Hudson |
| 3,337,238 A | 8/1967 | Weasel, Jr. |
| 3,341,222 A | 9/1967 | Roberts |
| 3,560,021 A | 2/1971 | Watson |
| 3,675,943 A | 7/1972 | Moore et al. |
| 3,721,459 A | 3/1973 | Lea |
| 3,784,226 A | 1/1974 | Wilfert et al. |
| 3,784,244 A | 1/1974 | Emi |
| 3,794,373 A | 2/1974 | Manning |
| 3,809,167 A | 5/1974 | Glider |
| 3,866,943 A | 2/1975 | Innis |
| 3,874,697 A | 4/1975 | Thompson |
| 3,913,963 A | 10/1975 | Persicke |
| 3,934,901 A | 1/1976 | Hammerly |
| 3,956,111 A | 5/1976 | Manfredi |
| 4,076,295 A | 2/1978 | Gutman |
| 4,077,141 A | 3/1978 | Stedman |
| 4,093,290 A | 6/1978 | Pearson |
| 4,103,918 A | 8/1978 | Salden |
| 4,124,221 A | 11/1978 | Goings |
| 4,203,623 A | 5/1980 | Fenner et al. |
| 4,205,861 A | 6/1980 | Roberts et al. |
| 4,221,410 A | 9/1980 | Dawson |
| 4,249,632 A | 2/1981 | Lucchini et al. |
| 4,262,953 A | 4/1981 | McErlane |
| 4,325,563 A | 4/1982 | Brandon et al. |
| 4,362,310 A | 12/1982 | Goodall |
| 4,377,294 A | 3/1983 | Lockwood et al. |
| 4,582,351 A * | 4/1986 | Edwards ................ B60R 19/56 293/102 |
| 4,620,745 A | 11/1986 | Jacobs |
| 4,627,594 A | 12/1986 | Reed |
| 4,640,541 A | 2/1987 | Fitzgerald et al. |
| 4,688,824 A * | 8/1987 | Herring ................ B60R 21/34 280/762 |
| 4,763,939 A | 8/1988 | Zhu |
| 4,877,266 A * | 10/1989 | Lamparter ............ B60R 19/56 280/762 |
| 4,930,823 A | 6/1990 | Rivera |
| 4,944,104 A | 7/1990 | Kowalczyk |
| 5,027,990 A | 7/1991 | Sonnenberg |
| 5,199,762 A | 4/1993 | Scheele et al. |
| 5,280,990 A | 1/1994 | Rinard |
| 5,313,189 A | 5/1994 | Dodd et al. |
| 5,333,923 A | 8/1994 | Whitfield |
| 5,462,324 A | 10/1995 | Bowen et al. |
| 5,735,560 A | 4/1998 | Bowen et al. |
| 5,823,586 A | 10/1998 | Marley |
| 5,836,399 A | 11/1998 | Maiwald et al. |
| 5,847,642 A | 12/1998 | Esposito et al. |
| 5,961,137 A | 10/1999 | Knight |
| 6,007,102 A | 12/1999 | Helmus |
| 6,095,562 A | 8/2000 | Busse |
| 6,152,469 A | 11/2000 | Gadowski |
| 6,193,278 B1 | 2/2001 | Ward et al. |
| 6,263,996 B1 | 7/2001 | Welch |
| 6,554,306 B1 | 4/2003 | Gaspar |
| 6,814,378 B1 * | 11/2004 | Marmur ................ B60R 19/38 293/103 |
| 6,827,372 B2 | 12/2004 | Barr et al. |
| 6,886,862 B2 | 5/2005 | Matthew |

(56) References Cited

U.S. PATENT DOCUMENTS

| | | |
|---|---|---|
| 7,192,078 B2 | 3/2007 | Buley et al. |
| 7,258,366 B2 | 8/2007 | Yingling et al. |
| 7,793,985 B1 | 9/2010 | Coloma |
| 7,806,464 B2 | 10/2010 | Cardolle |
| 7,942,470 B2 | 5/2011 | Boivin et al. |
| 7,992,923 B2 | 8/2011 | Dayton |
| D657,293 S | 4/2012 | Barron |
| D657,724 S | 4/2012 | Barron |
| 8,226,158 B1 | 7/2012 | Jackson |
| 8,322,778 B1 | 12/2012 | Pfaff |
| 2001/0004873 A1 | 6/2001 | Lamparter |
| 2002/0024213 A1 | 2/2002 | Hawes |
| 2003/0141714 A1 | 7/2003 | Matthew |
| 2004/0140663 A1 | 7/2004 | Barr et al. |
| 2005/0096798 A1* | 5/2005 | Bowman ............ B60K 28/12 701/1 |
| 2005/0104390 A1 | 5/2005 | Norelius |
| 2005/0110266 A1 | 5/2005 | Barr et al. |
| 2009/0218787 A1 | 9/2009 | Jones et al. |
| 2011/0018289 A1 | 1/2011 | Barron |
| 2012/0248799 A1 | 10/2012 | Barron |
| 2012/0286528 A1 | 11/2012 | Barron |
| 2015/0183395 A1* | 7/2015 | Revankar ............ B60R 19/40 180/274 |
| 2015/0224949 A1* | 8/2015 | Cuddihy ............ B60R 19/023 293/118 |
| 2016/0031409 A1* | 2/2016 | Barron ............ B60R 21/34 293/58 |

FOREIGN PATENT DOCUMENTS

| | | | |
|---|---|---|---|
| FR | 464183 A * | 3/1914 | ........... B60R 19/565 |
| GB | 23362362 | 10/1913 | |
| GB | 153794 | 11/1920 | |
| GB | 284874 | 2/1928 | |
| GB | 809624 | 2/1959 | |
| JP | 04-176784 | 6/1992 | |
| WO | WO 2007/115572 | 10/2007 | |

OTHER PUBLICATIONS

Percy Hawksworth, Safety device or drive out-body, for motor vehicles, 1914, ProQuest Dialog, FR 464 183 A, Machine Translation of Description (Year: 1914).*

International Search Report on PCT/US2016/055767 dated Dec. 30, 2016.

* cited by examiner

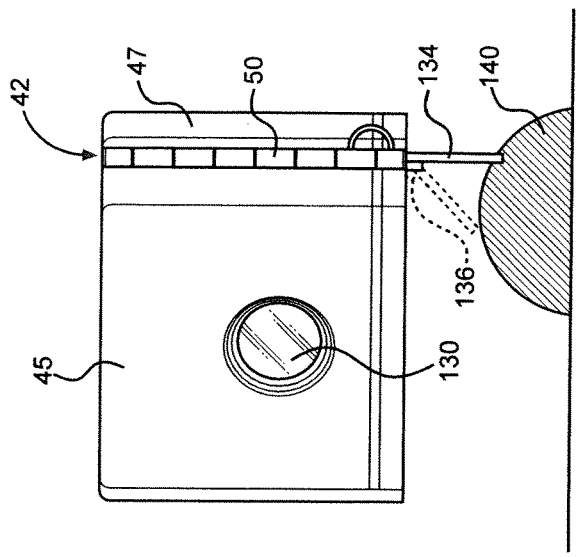
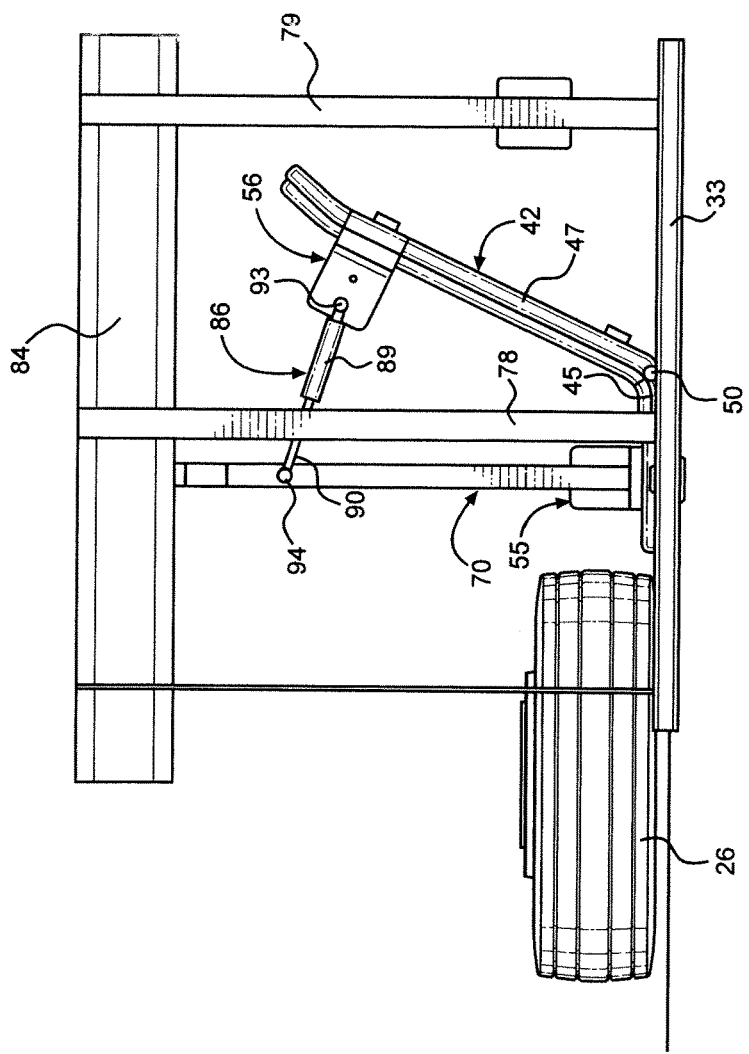
FIG. 4
FIG. 3

VEHICLE SAFETY GUARD

BACKGROUND OF THE INVENTION

Field of the Invention

The present invention pertains to the art of vehicle safety devices and, more particularly, to a safety device mounted to a vehicle and including a guard portion which is supported at a sharp angle and/or for pivotal movement in front on a wheel set of the vehicle for deflecting animate and inanimate objects from in front of the vehicle wheels.

Discussion of the Prior Art

For a range of reasons, various transportation vehicles are designed with a rather high ground clearance. For instance, buses employed in metropolitan mass transit systems and school buses can have associated high ground clearances. Unfortunately, there are inherent dangers associated with the operation of vehicles with high ground clearances that are not found in other vehicles which have low ground clearances. Many of the most serious of these injuries are a result of individuals coming into contact with a wheel of the vehicle, such as when a person slips and falls in the road adjacent a wheel of a bus and the bus abrades the skin or crushes a body part of the individual. In addition, inanimate objects can also be crushed.

To address these concerns, it has been proposed in the art to mount a safety guard directly in front of wheels on a bus to establish a safety barrier between the wheels and animate or inanimate objects. More specifically, as represented by U.S. Pat. Nos. 5,462,324, 5,735,560 and 8,567,802 which are incorporated herein by reference, it is known to mount a safety barrier to either the undercarriage structure or side panel of a vehicle, such as a bus, with the safety barrier including a lower edge extending directly along a ground surface. The safety barrier is fixedly supported at various locations, such as to axle, frame and/or suspension structure. The safety barrier is angled slightly rearwardly and outwardly from a centerline of the vehicle, generally in the order of 20°-25°, such that, if an object is encountered during movement of the bus, the safety barrier can direct the object out from under the vehicle to a position out of the path of the vehicle wheels.

Regardless of the existence of vehicle underbody safety guards, there is still seen to exist a need for a safety guard having enhanced mounting and operation, thereby establishing an effective, potentially lifesaving safety system for use on a wide range of vehicles having rather high ground clearances.

SUMMARY OF THE INVENTION

The present invention is directed to providing a safety guard for a vehicle, such as a school or transit bus, including a frontal guard positioned at an angle in front of one or more wheels of the vehicle that will function to push individuals or other animate objects lying in the path of the vehicle out of the path of the wheels for safety purposes. The safety guard is positioned close enough to the ground so that, if an object is encountered, the safety barrier forces the object out from under the vehicle and out of the wheel path. In accordance with one aspect of the invention, the safety guard includes a first guard section which is mounted to a side panel or underbody portion of the vehicle so as to be fixed in place, and a second guard section which pivots relative to the first guard section. The first guard section can be arranged parallel to a side panel of the vehicle or angled relative to a direction of travel of the vehicle, while the second guard section extends inwardly and forwardly of the first guard section in a first operational position. The first and second guard sections are hingedly interconnected such that the second guard section can pivot or otherwise shift to at least a second operational position relative to the first guard section upon engagement with an animate or inanimate object. At the same time, the second guard section is biased or otherwise forcibly shiftable by an actuator, such as a shock absorbing device, toward the first operational position. In accordance with another aspect of the invention, the second guard section is specifically angled, particularly at an angle of at least approximately 30°, to promote rapid deflection of the animate object.

With this construction, the safety guard will not only function to deflect animate body parts from in front of a vehicle wheel, but will also dampen engagement of the animate body part with the safety guard. In addition, the biased, pivotal mounting of the safety guard minimizes any potential damage to the safety guard upon engagement with an inanimate body, such as a curb, during operation of the vehicle. Additional safety controls, such as in the form of danger sensors and warning lights, are also employed to further add to the overall effectiveness of the system. Certainly, while the invention has particular utility in school and mass transit buses, it can also be used to prevent injuries in a wide range of vehicles. In any case, additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

FIG. 3 is an upper perspective view illustrating the mounting of the safety guard assembly of FIG. 1;

FIG. 4 is a perspective view showing a portion of the safety guard assembly engaging a road speed bump.

DETAILED DESCRIPTION OF THE INVENTION

Figure 1:
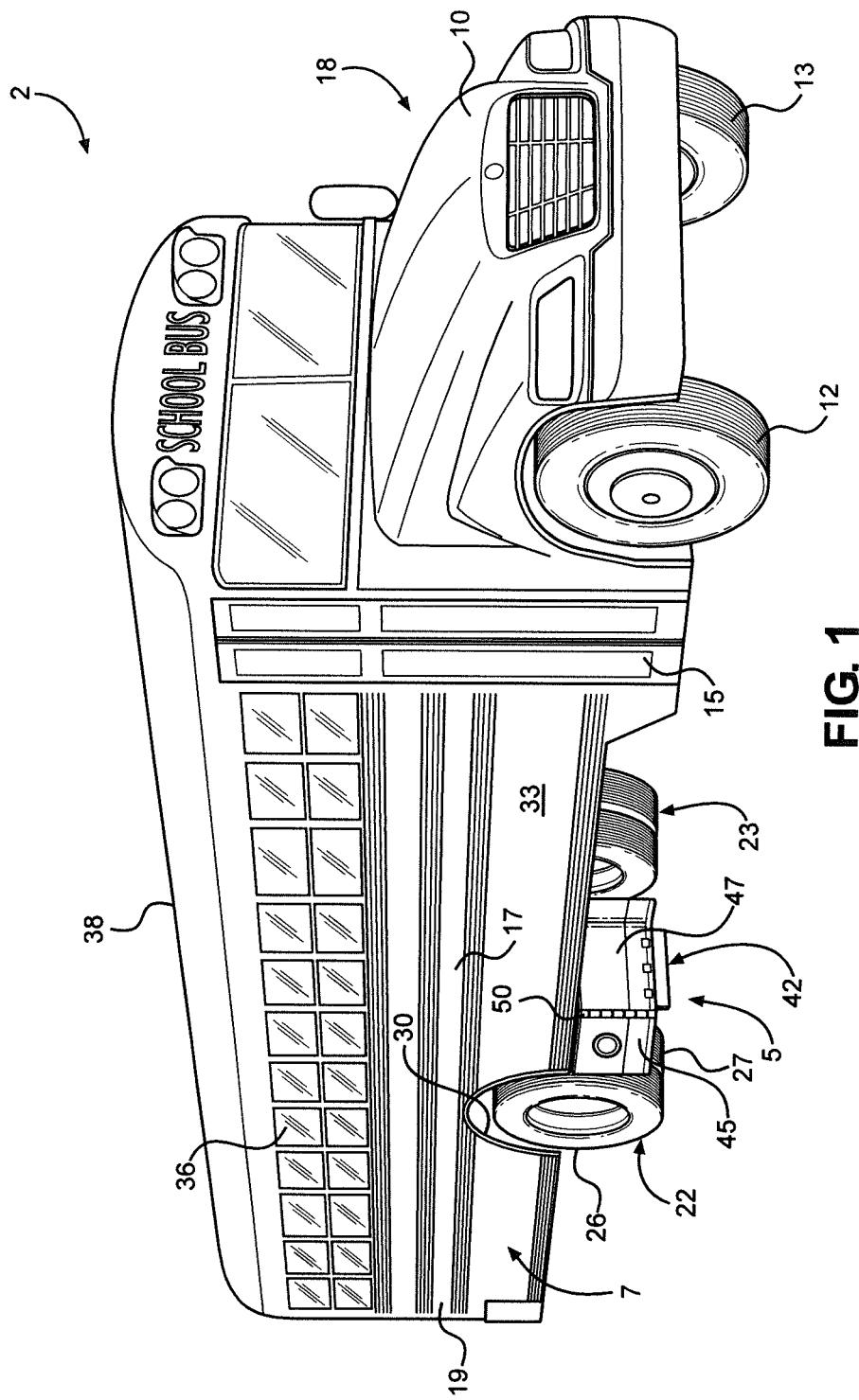
FIG. 1 is a perspective view of a school bus having mounted thereto a safety guard assembly in accordance with an embodiment of the invention.

With initial reference to FIG. 1, a vehicle 2, shown as a school bus, has attached thereto a safety guard 5 constructed in accordance with the present invention. In general, vehicle 2 includes a body 7 having a front end 8 including a hood 10 beneath which is provided an engine (not shown), and front steerable wheels 12 and 13. Behind front wheels 12 and 13 is shown a forward most side door 15 which leads to a middle section 17 of vehicle body 7 and a rear end section 19. Supporting rear end section 19 is a pair of rear wheel assemblies 22 and 23. Each rear wheel assembly 22, 23 is shown to include dual wheels 26 and 27 arranged in a wheel well 30 created in a side panel 33 of vehicle body 7. Also provided in side panel 33 are various fore-to-aft spaced windows 36 which are vertically arranged below a roof 38. More importantly, in accordance with the present invention, safety guard 5 includes a frontal guard 42 having a first, fixed section 45 and a second, pivotable section 47 which is connected to first, fixed section 45 through a hinge 50 as detailed below.

Figure 2:
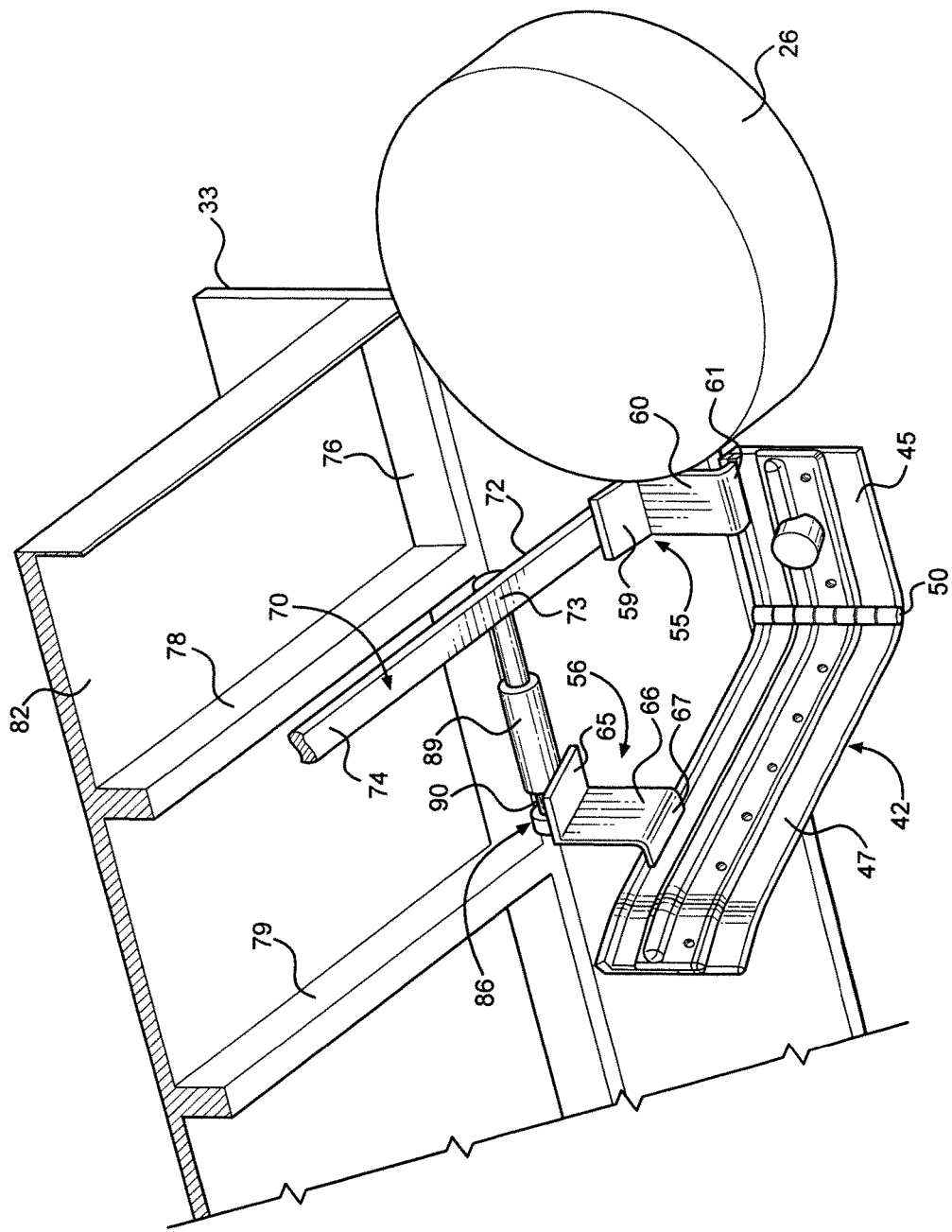
FIG. 2 is a lower schematic view illustrating the mounting of the safety guard assembly of FIG. 1.

As will become more fully evident herein, safety guard 5 can be mounted in an operational position in a number of ways. Reference will now be made to FIGS. 2 and 3 in discussing certain mounting arrangements particularly adapted for use in connection with mounting safety guard 5 on a vehicle 2 having a considerably high ground clearance, such as a school bus. In the illustrated embodiment, frontal guard 42 is mounted through first and second, generally Z-shaped brackets 55 and 56. As shown, first bracket 55 includes a first leg 59 fixed to first fixed section 45 of frontal guard 42, a central plate 60 and a second leg 61. In a similar manner, second bracket 56 includes a first leg 65 fixed to second pivotable section 47 of frontal guard 42, a central plate 66 and a second leg 67. A crossbar 70 includes a first end portion 72 fixed to first leg 59, an intermediate portion 73 and a second end portion 74.

Crossbar 70 is designed to be affixed to the underbody of vehicle 2. In the embodiment shown, the underbody of vehicle 2 includes a side frame member 76 and various cross frame members 78 and 79 which support a floor board 82. Although various attaching arrangements can be employed, crossbar 70 actually extends between and is affixed to each of side frame member 76 and a center beam 84 (see FIG. 3). As also shown in these figures, safety guard 5 includes an actuator or ejector 86, such as a biased linear actuator including a cylinder portion 89 and a shaft portion 90. As perhaps best shown in FIG. 3, cylinder portion 89 is attached to first leg portion 65 of second bracket 56 through a first pivot connection 93. At the same time, shaft portion is attached to intermediate portion 73 of crossbar 70 through a second pivot connection 94.

With the illustrated mounting arrangement, first guard section 45 is mounted to a side panel or underbody portion of vehicle 2 so as to be fixed in place, while second guard section 47 can pivot relative to first guard section 45 about hinge 50. At the same time, frontal guard 42 is maintained a few inches, generally in the order of 3-5 inches, above a ground surface (not separately labeled). The first guard section 45 can be arranged parallel to (even substantially flush with) side panel 33 of vehicle 2 or angled relative to a direction of travel of the vehicle 2, while the second guard section 47 extends inwardly and forwardly of the first guard section 45 in a first operational position. In general, it is preferred that second guard section 47 be angled at least approximately 30° (note "approximately" in the context of the invention encompasses ±2°), more specifically between 30°-45°, relative to a lateral crosswise axis of vehicle 2 (i.e., second guard section 47 is angled at an angle of at least approximately 120 degrees in the first operational position from first guard section 45). In addition, second guard section 47 includes a terminal, flared end portion (not separately labeled) which is angled an additional 10°-20°, preferably approximately 15° (i.e., approximately 135° from first guard section 45). As first and second guard sections 45, 47 are hingedly interconnected, the second guard section 47 can pivot or otherwise be deflected to at least a second operational position relative to the first guard section 45 upon engagement with an animate or inanimate object while vehicle 2 is in motion. At the same time, the second pivotable guard section 47 is biased by actuator 86, in a manner detailed more fully below, toward the first operational position. With this arrangement, frontal guard 42 is particularly employed to effectively function to forcibly push individuals or other animate objects which may lie in the path of vehicle 2 out of the path of wheels 26 and 27, thereby preventing the animate object from being crushed or otherwise damaged by wheels 26 and 27 of vehicle 2. The quite high angling of the second guard section 47 is extremely effective to rapidly deflect an individual, particularly as the applied lateral vector force onto the individual is substantially increased. With this arrangement, there is no significant delay in removing the individual from harm's way and minimizing the amount of time the individual is in the path of wheels 26 and 27.

Although also applicable to more low riding buses, the above-described mounting configuration is considered to be optimally employed in connection with vehicles which have undercarriage body portions which are raised quite high, such as many school buses. In rather high ground clearance vehicle 2, floor board 82 may be in the order of 40 inches above the ground. In any case, in connection with each of the embodiments disclosed, it should be noted that the overall safety guard 5 is preferably formed as a multi-piece, hinged unit which is mounted in front of select vehicle wheels and extends across a portion of the underbody, such as in the order of 2 feet, while having a minimal gap between safety guard 5 and the ground. Certainly, provisions can be made in the overall mounting arrangement for vertically adjusting frontal guard 5 in assuring an effective ground clearance for a wide variety of vehicles. The frontal guard 42 can be formed of plastic, rubber, urethane, aluminum or steel, although other known materials could be used to create a physical barrier strong enough to push a child or adult from in front of wheels 26 and 27, with a highly durable, impact resistant urethane material that is abrasion resistant, corrosion proof, smooth to the touch and color fast, being preferred. In addition, it would be possible to manufacture at least a portion of frontal guard 42 from recycled tire rubber or fiberglass. To reduce the weight and thickness of frontal guard 42, it is possible to employ an inner wire mesh for internal strengthening without sacrificing overall effectiveness.

FIG. 4 illustrates some peripheral aspects of the invention including the provision of providing a lighting unit 130 on fixed section 45 of frontal guard 42, with lighting unit 130 providing a warning signal as discussed further below. In addition, frontal guard 42 can be provided with a flap or dam member 134 which extends across a substantial portion of pivotable section 47 of frontal guard 42 and is attached thereto through a biased hinge unit indicated at 136. With this arrangement, flap 134 further decreases the spacing between frontal guard 42 and the road surface. In addition, if a road bump or debris, such as indicated at 140, is encountered during operation of vehicle 2, flap 134 can readily deflect as indicated by the dotted lines in FIG. 4, and then reassume its substantially vertically extending operational position.

Figure 5:
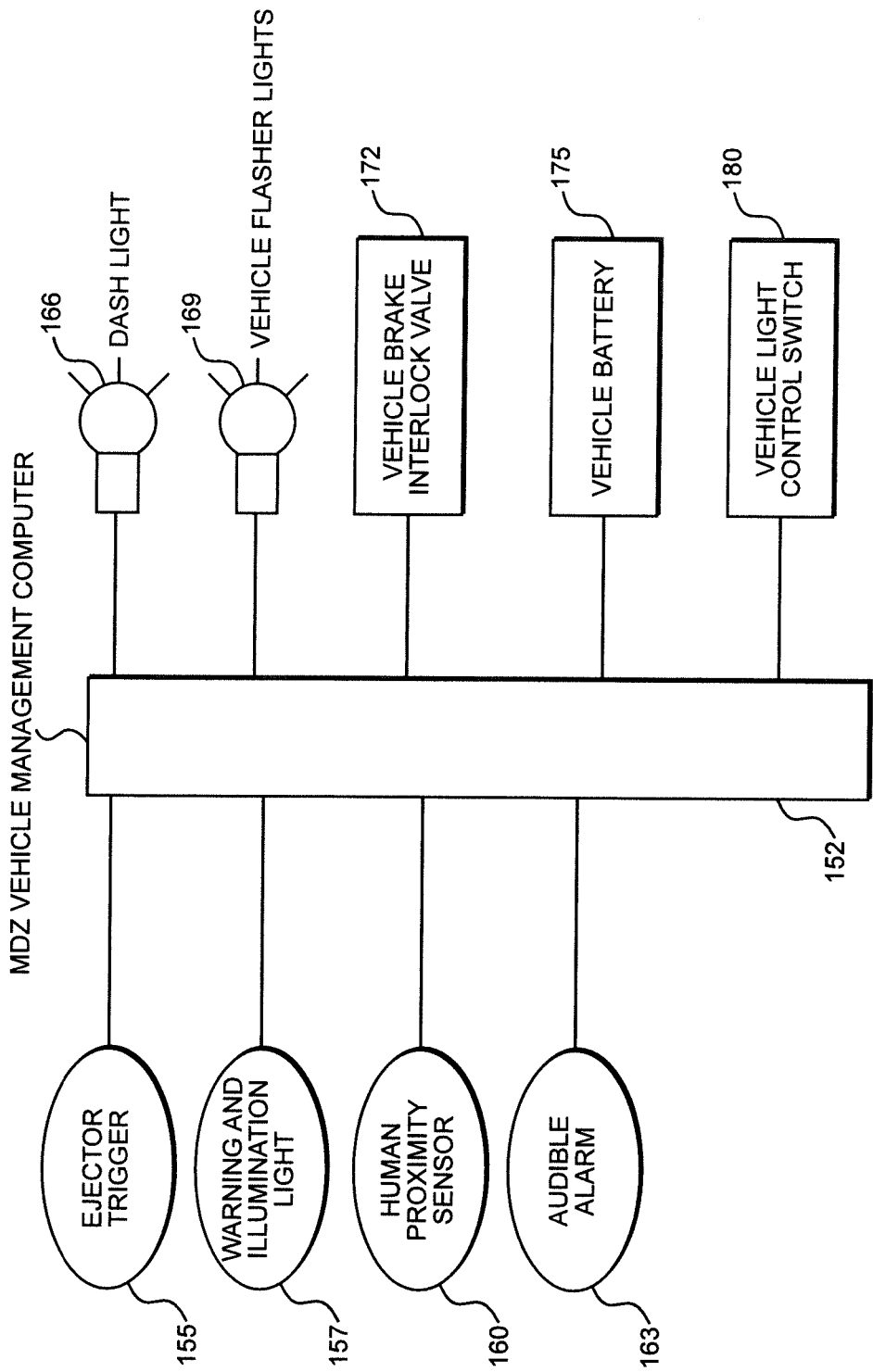
FIG. 5 is a schematic view of a safety control system employed in connection with the safety guard assembly of the invention.

The safety guard arrangement described above can operate purely mechanical in nature. That is, actuator 86 can function to eject an animate body from in front of wheels 26 and 27 just based on mechanics, such as would be the case employing a spring, an elastomeric body, a mechanical spring biased fluid (pneumatic or hydraulic) actuator or other device relying on stored energy. However, it should also be recognized that electrical or otherwise powered actuator or ejector arrangements could also be utilized, such as a powered pneumatic or hydraulic actuator, an electric motor, a slow release air bag system, or other positively driven active displacement mechanism. In fact, the safety guard arrangement of the invention can be integrated into or individually controlled by an electrically-based vehicle management system. FIG. 5 schematically illustrates an exemplary vehicle management system for use with the overall invention. As shown, the management system includes a CPU 152 to which is connected an ejector trigger 155, a warning signaler 157, a human proximity sensor 160, an audible alarm 163, a dash light 166, vehicle flasher lights 169, a vehicle brake interlock valve 172, a battery 175 for vehicle 2 and a vehicle light control switch 180. Ejector trigger 155 is utilized to signal CPU 152 when actuator 86 is shifted or deflected a predetermined amount, e.g., greater than one inch. In general, ejector trigger 155 can take various forms, such as a pressure sensitive trigger or switch located on the face of frontal guard 42, a local proximity sensor, a light beam sensor, or the like. In any case, when ejector trigger 155 is activated, a signal is sent to CPU 152 which can then automatically control other devices. In particular, actuator 86 can be actively controlled so as to establish an active displacement mechanism, such as those mentioned above, that operates to forcibly eject animate bodies such as by pushing the bodies from in front of wheels 26 and 27 by pivoting frontal second pivotable section 47 to at least its first operational position following deflection. That is, upon receiving a signal from ejector trigger 155, actuator 86 can be sent a signal from CPU 152 forcing damper unit 112 to extend, thereby pivoting second pivotable section 47 about hinge 50 to force the animate body to be displaced laterally from beneath vehicle 2. CPU 152 can operate other safety features as well, including lighting unit 130 that can form part of warning signaler 157 which is preferably activated to illuminate an safety zone associated with frontal guard 152 at all times when vehicle 2 is stopped for loading and unloading, i.e., door 15 is opened; dash light 166 which is for the operator of vehicle 2, such as to confirm a proper functioning and ready state following system testing; audible alarm 163 and vehicle flasher lights 169 which can be activated upon CPU 152 receiving a signal from ejector trigger 155; and/or brake interlock valve 172 which interfaces with a vehicle brake system, such as to prevent vehicle 2 from being put in motion from a stop condition if dash light 166 is not on or automatically stopping vehicle 2 if ejector trigger 155 is activated. Any of these visual indicators can be deactivated by a user of vehicle 2 through vehicle light control switch 180. In addition, in a proactive manner, one or more human proximity sensors 160 can be employed to send signals to CPU 152 by sensing the presence of an animate body in a region directly adjacent safety guard 5 in a manner corresponding to known vehicle collision sensing systems. That is, if it is sensed that a body is about to be engaged by safety guard 5, human proximity sensor 160 will send a signal to CPU 152 which, in turn, can electrically operate in the manner discussed above to signal and address the safety situation.

Although described with reference to preferred embodiments of the invention, it should be readily understood that various changes and/or modifications can be made to the invention without departing from the spirit thereof. For instance, the particular geometry of the guard and/or mounting structure can vary, as well as the materials from which the guard and/or mounting structure are made. Although the safety guard assembly is only shown to be mounted on door side of the vehicle, another safety guard assembly could be mounted on the opposing side of the vehicle for another wheel set. The two opposing safety guard could even be interconnected, for example, through an elongated, potentially V-shaped, deflectable common second guard section extending across and underneath the vehicle. Furthermore, the safety guard assembly of the invention can be used in combination with other guard structure, such as a wheel well skirt. In general, the invention is only intended to be limited by the scope of the following claims.

I claim:

1. A vehicle comprising:
    a body having a side panel, a frame and a floor board;
    a pair of front steerable wheels spaced in a transverse direction of the body of the vehicle;
    at least one pair of transversely spaced rear wheels which are longitudinally spaced from the front steerable wheels;
    a door provided along the side panel; and
    a safety guard assembly for deflecting animate body parts from in front of at least one of the front and rear wheels, said safety guard assembly including a first guard section fixed to the body and a second guard section extending inwardly and forwardly of the first guard section and at an angle between 30°-45° relative to a lateral crosswise axis of the vehicle, in a first operational position.

2. The vehicle according to claim 1, wherein the second guard section includes a terminal end portion, remote from the first guard section, which is angled an additional 10°-20° relative to the first guard section.

3. The vehicle according to claim 2, wherein the terminal end portion is angled an additional, approximately 15°.

4. The vehicle according to claim 1, wherein the second guard section is hingedly connected to the first guard section about a substantially vertical axis such that the second guard section can pivot relative to the first guard section.

5. The vehicle according to claim 4, further comprising an actuator for forcibly shifting the second guard section relative to the first guard section.

6. A vehicle comprising:
    a body having a side panel, a frame and a floor board;
    a pair of front steerable wheels spaced in a transverse direction of the body of the vehicle;
    at least one pair of transversely spaced rear wheels which are longitudinally spaced from the front steerable wheels;
    a door provided along the side panel; and
    a safety guard assembly for deflecting animate body parts from in front of at least one of the front and rear wheels, said safety guard assembly including a first guard section fixed to the body and a second guard section extending inwardly and forwardly of the first guard section and at an angle of at least approximately 30° relative to a lateral crosswise axis of the vehicle, in a first operational position,
    wherein the first guard section is mounted directly forward of one of the at least one pair of transversely spaced rear wheels and extends substantially parallel to the side panel.

7. A vehicle comprising:
    a body having a side panel, a frame and a floor board;
    a pair of front steerable wheels spaced in a transverse direction of the body of the vehicle;
    at least one pair of transversely spaced rear wheels which are longitudinally spaced from the front steerable wheels;
    a door provided along the side panel; and
    a safety guard assembly for deflecting animate body parts from in front of at least one of the front and rear wheels, said safety guard assembly including:
        a first guard section fixed to the body; and
        a second guard section extending inwardly and forwardly of the first guard section in a first operational position while being hingedly connected to the first guard section such that the second guard section can pivot relative to the first guard section to a second operational position upon engagement with an animate or inanimate object while the vehicle is in motion.

8. The vehicle according to claim 7, wherein the first guard section extends substantially parallel to the side panel and the second guard section is hingedly connected to the first guard section for pivotal movement about a substantially vertical axis.

9. The vehicle according to claim 7, further comprising an actuator for forcibly shifting the second guard section to the first operational position.

10. The vehicle according to claim 9, wherein the actuator constitutes a shock absorbing device biasing the second guard section toward the first operational position.

11. The vehicle according to claim 7, further comprising a flap member pivotally attached to and extending downward from a lower end portion of the second guard section.

12. The vehicle according to claim 7, further comprising at least one safety light mounted to the first guard section so as to be exposed from a side of the vehicle.

13. The vehicle according to claim 7, further comprising means for sensing and signaling operation of the second guard section.

14. A vehicle comprising:
a body having a side panel, a frame and a floor board;
a pair of front steerable wheels spaced in a transverse direction of the body of the vehicle;
at least one pair of transversely spaced rear wheels which are longitudinally spaced from the front steerable wheels;
a door provided along the side panel; and
a safety guard assembly for deflecting animate body parts from in front of at least one of the front and rear wheels, said safety guard assembly including:
a first guard section fixed to the body;
a second guard section extending inwardly and forwardly of the first guard section in a first operational position while being deflectable to a second operational position upon engagement with an animate or inanimate object while the vehicle is in motion; and
at least one actuator for forcibly shifting the second guard section to the first operational position.

15. The vehicle according to claim 14, wherein the second guard section is hingedly connected to the first guard section about a substantially vertical axis such that the second guard section can pivot relative to the first guard section to the second operational position upon engagement with an animate or inanimate object while the vehicle is in motion.

16. The vehicle according to claim 15, wherein the actuator constitutes a shock absorbing device biasing the second guard section toward the first operational position.

17. The vehicle according to claim 15, further comprising a flap member pivotally attached to and extending downward from a lower end portion of the second guard section.

18. The vehicle according to claim 15, further comprising means for sensing and signaling operation of the second guard section.

19. A method of deflecting animate body parts from in front of a wheel of a vehicle including a body having a side panel, a frame and a floor board, a pair of front steerable wheels spaced in a transverse direction of the body of the vehicle, at least one pair of transversely spaced rear wheels which are longitudinally spaced from the front steerable wheels, a door provided along the side panel and a frontal guard piece, including a first, fixed guard section and a second, movable guard section extending inwardly and forwardly of the first guard section in a first operational position, beneath the body and in front of the wheel, said method comprising:
deflecting an animate body from in front of the wheel and in direct engagement with the second guard section while the vehicle is in motion by pivoting the second guard section to a second operational position relative to the first guard section about a hinge interconnecting the first and second guard sections upon engagement with the animate body and directing the animate body from beneath the vehicle so as to prevent the animate body part from being run-over and crushed by the wheel.

20. The method of claim 19, further comprising: dampening pivoting movement of the second guard section through operation of at least one actuator.

21. The method of claim 19, further comprising: electrically sensing and signaling operation of the second guard section.

* * * * *